United States Patent
Self et al.

(10) Patent No.: US 10,981,647 B2
(45) Date of Patent: Apr. 20, 2021

(54) ROTOR SPAN-BALANCE POCKET

(71) Applicant: Bell Helicopter Textron Inc., Fort Worth, TX (US)

(72) Inventors: Robert Self, Fort Worth, TX (US); Nathan P. Green, Mansfield, TX (US); John R. McCullough, Weatherford, TX (US); Russell Cole, Euless, TX (US); Paul Sherrill, Grapevine, TX (US); Robert Wardlaw, Keller, TX (US)

(73) Assignee: BELL HELICOPTER TEXTRON INC., Fort Worth, TX (US)

( * ) Notice: Subject to any disclaimer, the term of this patent is extended or adjusted under 35 U.S.C. 154(b) by 836 days.

(21) Appl. No.: 15/666,654

(22) Filed: Aug. 2, 2017

(65) Prior Publication Data

US 2019/0039726 A1 Feb. 7, 2019

(51) Int. Cl.
| | |
|---|---|
| B64C 27/00 | (2006.01) |
| F03D 3/06 | (2006.01) |
| B64C 27/473 | (2006.01) |
| B64C 27/46 | (2006.01) |
| B64C 27/82 | (2006.01) |
| B64C 11/00 | (2006.01) |

(52) U.S. Cl.
CPC .......... *B64C 27/008* (2013.01); *B64C 27/473* (2013.01); *F03D 3/062* (2013.01); *B64C 11/008* (2013.01); *B64C 27/46* (2013.01); *B64C 27/82* (2013.01); *B64C 2027/8236* (2013.01); *F05B 2230/60* (2013.01); *F05B 2260/966* (2013.01)

(58) Field of Classification Search
CPC ..... B64C 27/008; B64C 27/473; B64C 27/46; B64C 27/82; B64C 11/008; B64C 2027/8236; F05B 2260/966; F05B 2230/60
USPC ......................................................... 416/144
See application file for complete search history.

(56) References Cited

U.S. PATENT DOCUMENTS

| | | |
|---|---|---|
| 3,999,888 A | 12/1976 | Zincone |
| 5,273,398 A | 12/1993 | Reinfelder et al. |

(Continued)

FOREIGN PATENT DOCUMENTS

| | | |
|---|---|---|
| DE | 4005896 A1 | 8/1991 |
| EP | 1598269 A2 | 11/2005 |
| EP | 2711293 A2 | 3/2014 |

OTHER PUBLICATIONS

European Patent Office, Communication pursuant to Article 94(3) EPC for EP Appl. No. 17191478.1 dated Jan. 30, 2019, 5 pp.

(Continued)

*Primary Examiner* — David E Sosnowski
*Assistant Examiner* — Hakeem M Abdellaoui
(74) *Attorney, Agent, or Firm* — Daniel J. Chalker; Edwin S. Flores; Chalker Flores, LLP

(57) ABSTRACT

The present invention includes a rotor-blade span-balancing system, including a span-balance pocket in a surface of a rotor blade; a cover operably configured to cover the span-balance pocket, wherein the cover is operably configured to be substantially flush with the surface of the rotor blade surface when covering the span-balance pocket, and wherein the cover includes a cover boss for reacting centrifugal force of the cover into the rotor blade; and one or more span-balance weights attached to the cover to span-balance the rotor blade.

21 Claims, 6 Drawing Sheets

(56) References Cited

U.S. PATENT DOCUMENTS

| | | | | |
|---|---|---|---|---|
| 7,097,427 B2* | 8/2006 | Kuhns | ................... | B64C 27/008 |
| | | | | 416/144 |
| 2004/0222329 A1 | 11/2004 | Kuhns et al. | | |
| 2005/0254947 A1* | 11/2005 | Loftus | ................... | B64C 27/473 |
| | | | | 416/144 |
| 2014/0086750 A1* | 3/2014 | Cawthorne | ........... | B29C 65/002 |
| | | | | 416/145 |
| 2017/0057627 A1* | 3/2017 | Simkulak | ............... | B64C 27/473 |
| 2019/0031327 A1* | 1/2019 | Sherrill | ................ | B64C 27/008 |

OTHER PUBLICATIONS

European Patent Office, European Search Report for EP Appl. No. 17191478.1 dated Mar. 12, 2018, 5 pp.

* cited by examiner

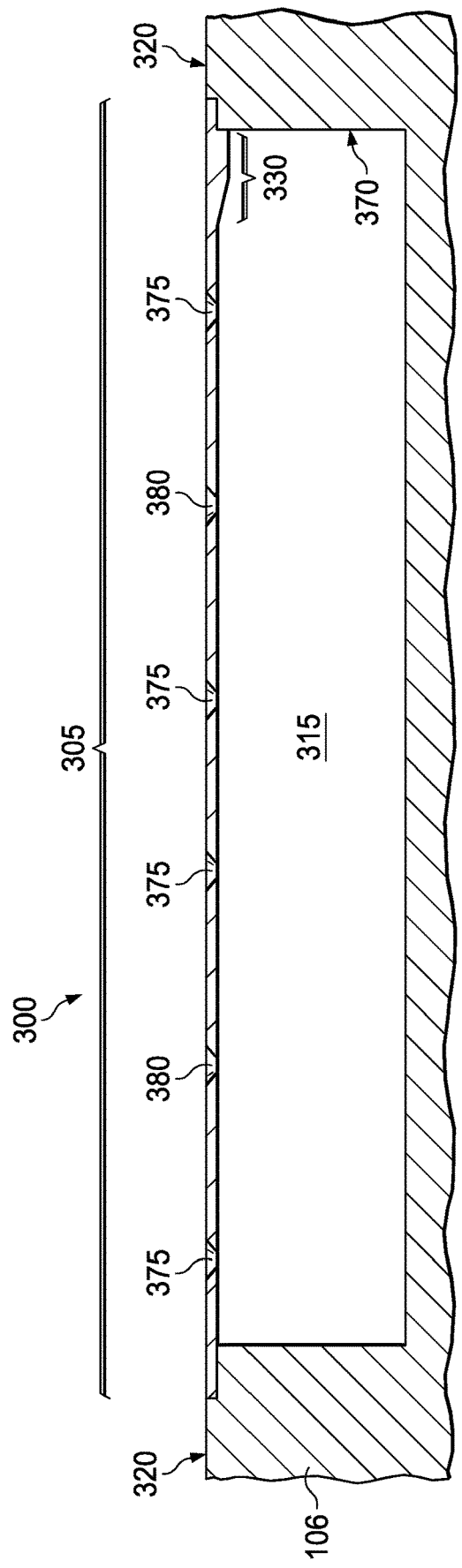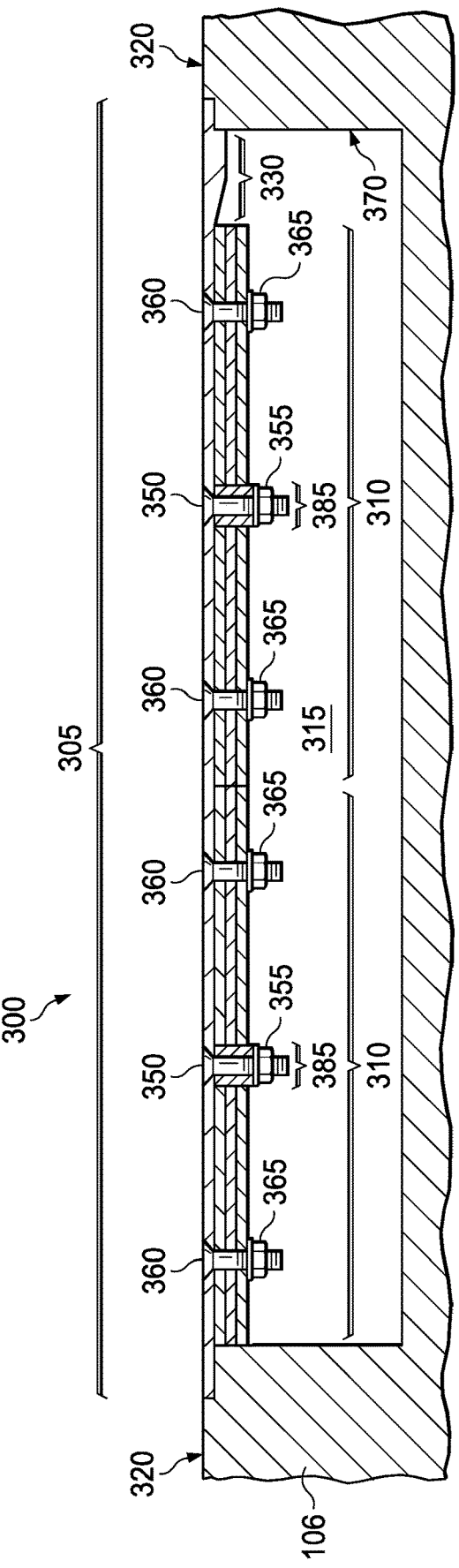

ROTOR SPAN-BALANCE POCKET

CROSS-REFERENCE TO RELATED APPLICATIONS

Not applicable.

STATEMENT OF FEDERALLY FUNDED RESEARCH

Not applicable.

TECHNICAL FIELD OF THE INVENTION

The present invention relates in general to the field of span-balancing rotors in aircraft systems, and more particularly, to a novel system for span-balancing a rotor in which centrifugal force is not reacted through fasteners or bondlines.

BACKGROUND OF THE INVENTION

Without limiting the scope of the invention, its background is described in connection with span balancing in rotorcrafts.

One example of an aircraft is a rotorcraft. A rotorcraft may include one or more rotor systems that must be span-balanced. Such rotors must include ways in which weights may be added, removed from, and distributed within rotor blades to substantially span-balance the rotor system and to react the centrifugal force of the weights such that fatigue of components, bondlines, and fasteners is reduced or eliminated.

Existing methods and devices for span-balancing rotor systems include bonding a pocket for weights into a rotor blade. The span-balance weights are deposited into the pocket. In such methods and devices, the centrifugal force of the weights is reacted by the bondlines of the pocket to the rotor blade. Existing methods and devices for span-balancing rotor systems also include attaching span-balancing weights onto a cover in the surface of a rotor with fasteners such as screws. In these methods and devices, the centrifugal force of the weights is reacted by shear through the fasteners. In both of these existing methods and devices, reaction of the centrifugal force of the weights is through bondlines or fasteners, thereby introducing fatigue that must be discovered and monitored through inspection, and further creating the need for maintenance, repair, or replacement of parts of the span-balancing systems. Methods and devices for span-balancing rotor systems that reduce or eliminate costly maintenance, repairs, or replacements are desirable.

SUMMARY OF THE INVENTION

In some embodiments of the disclosure, a rotor-blade span-balancing system is disclosed as including a span-balance pocket in a surface of a rotor blade; a cover operably configured to cover the span-balance pocket, wherein the cover is operably configured to be substantially flush with the surface of the rotor blade surface when covering the span-balance pocket, and wherein the cover includes a cover boss for reacting centrifugal force of the cover into the rotor blade; and one or more span-balance weights attached to the cover to span-balance the rotor blade. In one aspect, the rotor blade is a main rotor blade, a tail rotor blade, a proprotor blade, a propeller blade, or a wind-turbine blade. In one aspect, the cover is attached to the rotor blade with one or more cover fasteners. In one aspect, the one or more cover fasteners include one or more screws. In one aspect, the cover boss is integral with the cover. In one aspect, the cover boss is a machined integral portion of the cover. In one aspect, each of the one or more span-balance weights is attached to the cover with one or more weight fasteners. In one aspect, the one or more weight fasteners include one or more bolts or one or more nuts. In one aspect, the system further includes one or more weight bosses attached to the cover, wherein each of the one or more span-balance weights are in physical contact with one of the one or more weight bosses. In one aspect, the one or more weight bosses are integral with the cover, bonded to the cover, welded to the cover, fastened to the cover, or some combination thereof.

In some embodiments of the disclosure, a method of rotor-blade span balancing is disclosed as including providing a span-balance pocket in a surface of a rotor blade; attaching a cover for the span-balance pocket to the surface of the rotor blade, wherein the cover is substantially flush with the surface of the rotor blade when covering the span-balance pocket, and wherein the cover includes a cover boss for reacting centrifugal force of the cover into the rotor blade; and attaching one or more span-balance weights to the cover to span-balance the rotor blade. In one aspect, the rotor blade is a main rotor blade, a tail rotor blade, a proprotor blade, a propeller blade, or a wind-turbine blade. In one aspect, the method further includes attaching the cover to the rotor blade with one or more cover fasteners. In one aspect, the one or more cover fasteners include screws. In one aspect, the cover boss is integral with the cover. In one aspect, the integral cover boss is a machined integral portion of the cover. In one aspect, the attaching the one or more span-balance weights to span-balance the rotor blade is accomplished with one or more weight fasteners. In one aspect, the one or more weight fasteners include one or more bolts or one or more nuts. In one aspect, the method further includes attaching one or more weight bosses to the cover, wherein each of the one or more span-balance weights are in physical contact with one of the one or more weight bosses. In one aspect, the attaching one or more weight bosses to the cover includes machining the cover to form the one or more weight bosses to be integral with the cover, bonding the one or more weight bosses to the cover, welding the one or more weight bosses to the cover, or fastening the one or more weight bosses to the cover.

In some embodiments of the disclosure, a rotorcraft is disclosed as including a fuselage; one or more engines coupled to the fuselage; and one or more rotor systems coupled to the one or more engines, each rotor system including rotor blades, at least one rotor blade including a span-balance pocket in a surface of a rotor blade; a cover operably configured to cover the span-balance pocket, wherein the cover is operably configured to be substantially flush with the surface of the rotor blade when covering the span-balance pocket, and wherein the cover includes a cover boss for reacting centrifugal force of the cover into the rotor blade; and one or more span-balance weights attached to the cover to span-balance the rotor blade.

In addition to the foregoing, various other method, system, and apparatus aspects are set forth in the teachings of the present disclosure, such as the claims, text, and drawings forming a part of the present disclosure.

The foregoing is a summary and thus contains, by necessity, simplifications, generalizations, and omissions of detail. Consequently, those skilled in the art will appreciate that this summary is illustrative only and is not intended to be in any way limiting. There aspects, features, and advantages of the devices, processes, and other subject matter described herein will be become apparent in the teachings set forth herein.

BRIEF DESCRIPTION OF THE DRAWINGS

For a more complete understanding of the features and advantages of the present invention, reference is now made to the detailed description of the invention along with the accompanying figures, in which:

FIG. 5 shows a cross-section of an embodiment of the present invention;

FIG. 6 shows a cross-section of an embodiment of the present invention; and

DETAILED DESCRIPTION OF THE INVENTION

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
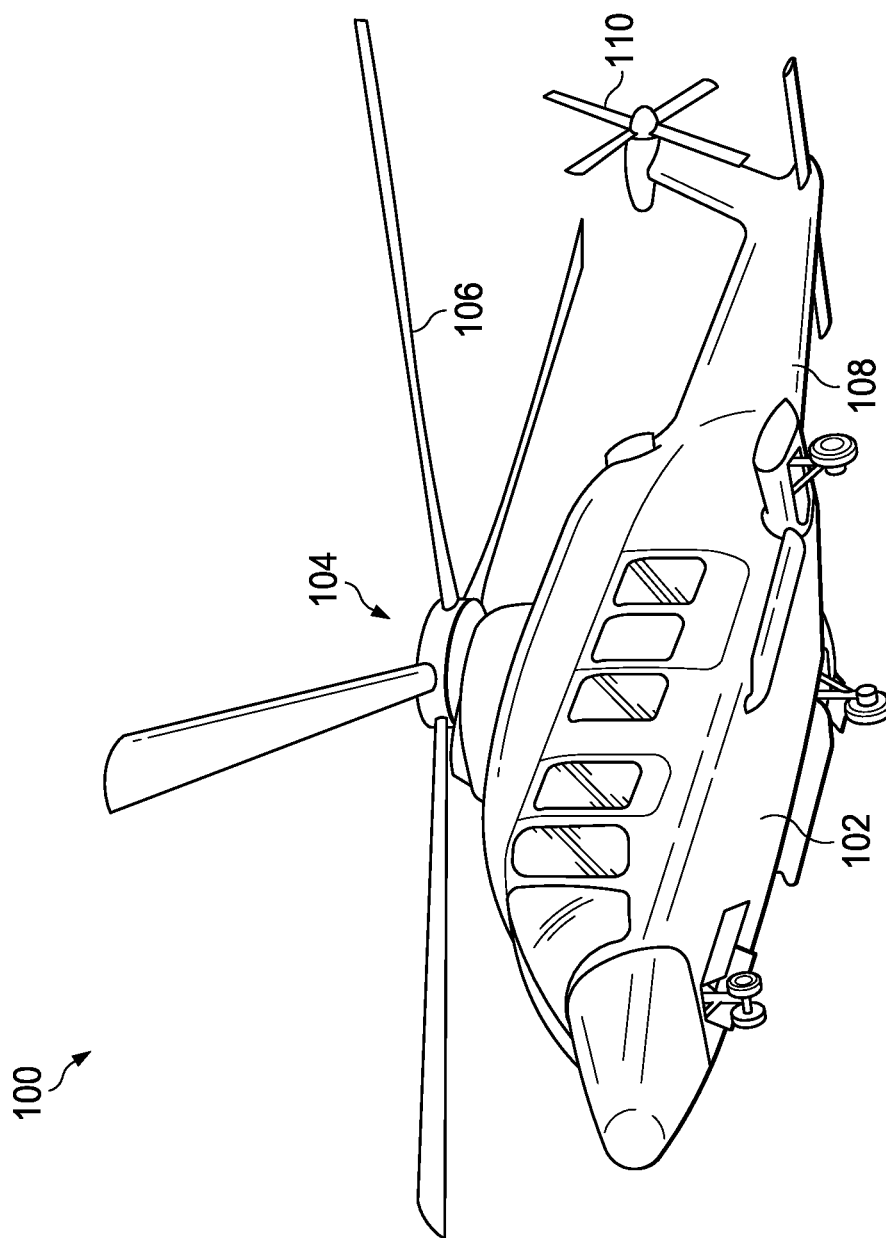
FIG. 1 shows a perspective view of a helicopter according to a particular embodiment of the present application.

FIG. 1 shows an aircraft 100 in accordance with a particular embodiment of the present application. In the exemplary embodiment, aircraft 100 is a helicopter having a fuselage 102 and a rotor system 104 carried thereon. A plurality of rotor blades 106 is operably associated with a rotor system 104 for creating flight. A tail boom 108 is depicted that further includes tail rotor 110.

Figure 2:
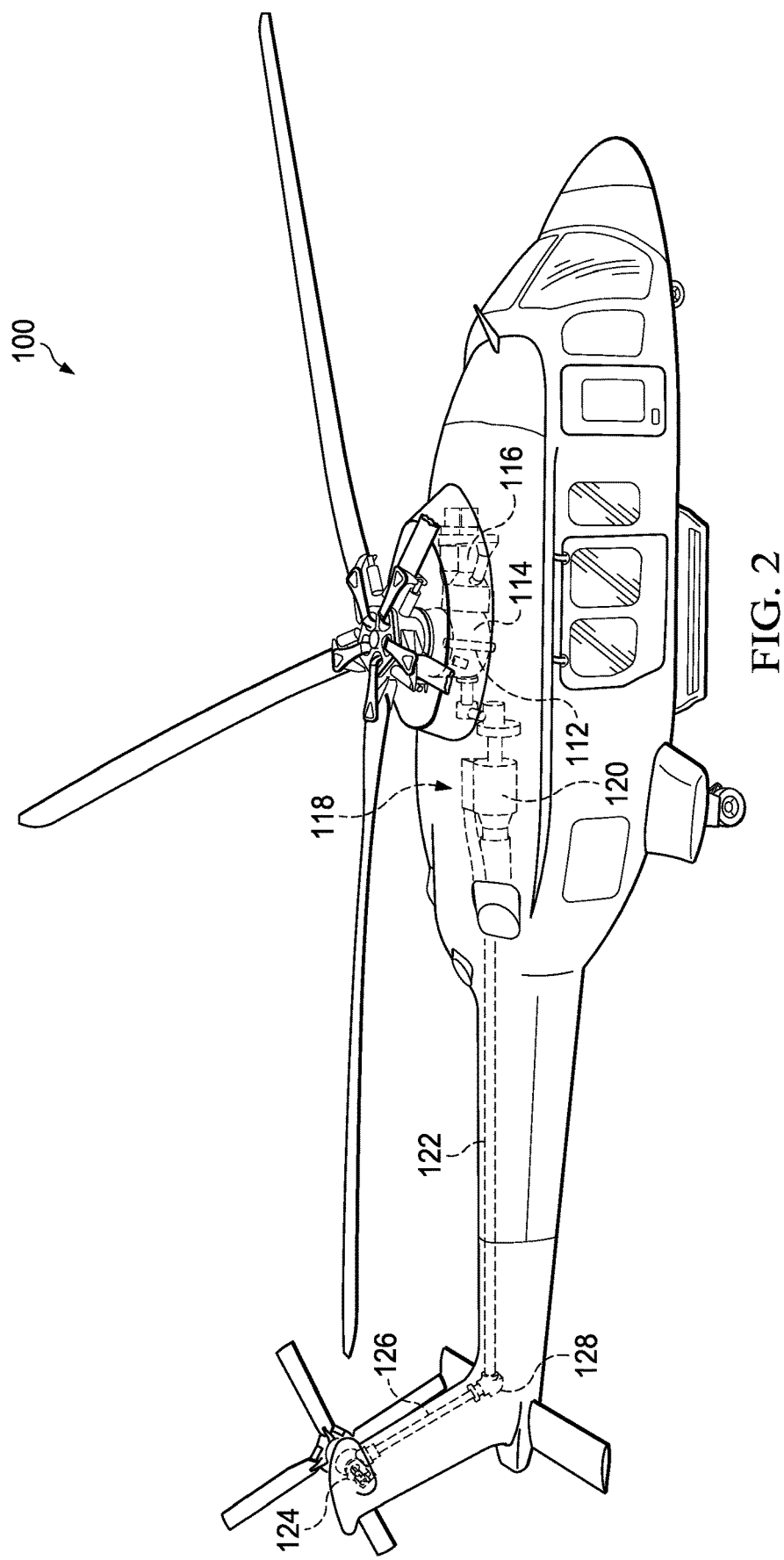
FIG. 2 shows a partial cross-section, perspective view of a helicopter according to an embodiment of the present application.

For example, FIG. 2 shows a partial cross-section, perspective view of aircraft 100 that includes additional detail of an embodiment of the present invention. Aircraft 100 further includes a rotor mast 112, which is connected to the main rotor gearbox 114. The main rotor gearbox 114 is connected to one or more accessory gear boxes 116. The engine compartment 118 contains one or more engines 120 and the main rotor gearbox 114 is connected to one or more engines 120. A tail rotor drive shaft 122 transmits mechanical rotation from the main rotor gearbox 114 to the tail rotor gear box 124, which is connected via tail rotor drive shaft 126, via intermediate gear box 128.

Figure 3:
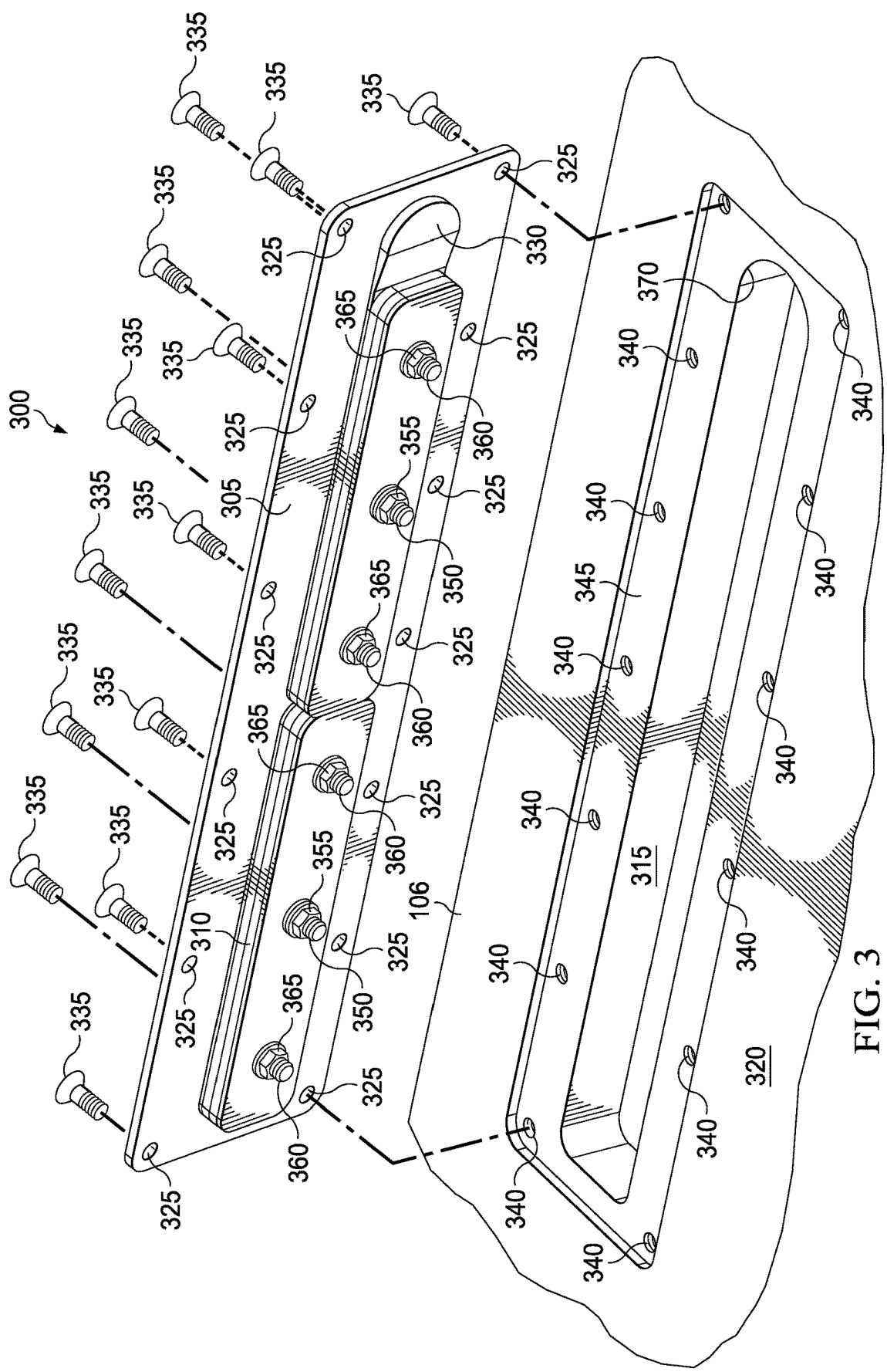
FIG. 3 shows a perspective view of an embodiment of the present invention.

FIG. 3 shows a perspective view of an embodiment of the present invention, rotor-blade span-balancing system 300. FIG. 3 illustrates both the inner side of cover 305 span-balance weights 310 attached and span-balance pocket 315 in rotor-blade surface 320 of rotor blade 106. The two banks of span-balance weights 310 illustrated here are exemplary; there may fewer or more span-balancing weights 310 in a given embodiment, and the one or more span-balancing weights 310 may be of varying sizes, weights, and shapes and may disposed differently to match specific requirements and constraints other embodiments. Span-balance pocket 315 may be, e.g., a cavity in the material of a rotor blade, such as a cavity machined into a tip block, or an open space such as an open space inside an opening cut into the upper surface of a rotor outer covering and a hollow rotor spar. Cover 305 includes cover fastener holes 325 and cover boss 330. Cover boss 330 is a shear boss that is machined integral portion of cover 305, and it may take the shape illustrated or a shape appropriate to the requirements and constraints of a particular embodiment. The centrifugal force of cover 305 is reacted to rotor-blade surface 320 and therefore to rotor blade 106 by shear through cover boss 330. As used herein, to react the centrifugal force of a first object to a second object is to cause the load of the reactive centrifugal force on the first object to bear on the second object. Cover fasteners 335 hold cover 305 to rotor-blade surface 320 by insertion through cover fastener holes 325 into surface fastener holes 340 in cover recess 345. Cover 305 is depicted as being held to rotor-blade surface 320 by cover fasteners 335, which may be for example, screws, but embodiments of the invention are not limited to the use of cover fasteners 335, cover fastener holes 325, or surface fastener holes 340. First weight-boss fasteners 350 and second weight-boss fasteners 355 are used to attach weight bosses (see FIG. 6), to cover 305. First weight-boss fasteners 350 are depicted as bolts and second weight-boss fasteners 355 are depicted as nuts, but embodiments of the invention are not limited to the depicted fasteners. Span-balance weights 310 are attached to cover 305 by first weight fasteners 360 and second weight fasteners 365. First weight fasteners 360 are depicted as bolts and second weight fasteners 365 are depicted as nuts, but embodiments of the invention are not limited to the depicted fasteners.

When attached to rotor-blade surface 320, cover 305 fits into cover recess 345 such that the outer surface of cover 305 and the heads of cover fasteners 335 are substantially flush with rotor-blade surface 320 and with, at most, a small gap between the edges of cover 305 and cover recess 345. The skilled artisan will recognize that the gap can be as small as a few thousands of an inch up to ⅛ of an inch or more depending on the tolerances required. Cover boss 330 and the span-balance weights 310 fit into span-balance pocket 315. Centrifugal force of cover 305 and span-balance weights 310 are reacted to the rotor blade 106 through cover boss 330 in physical contact with outboard edge 370 of span-balance pocket 315. If span-balance pocket 315 is a cavity, outboard edge 370 may be the upper part of the outboard wall of the cavity. If span-balance pocket 315 is an open space inside an opening cut into, e.g., a rotor or rotor spar, outboard edge 370 may be the outboard edge of the opening.

Figure 4:
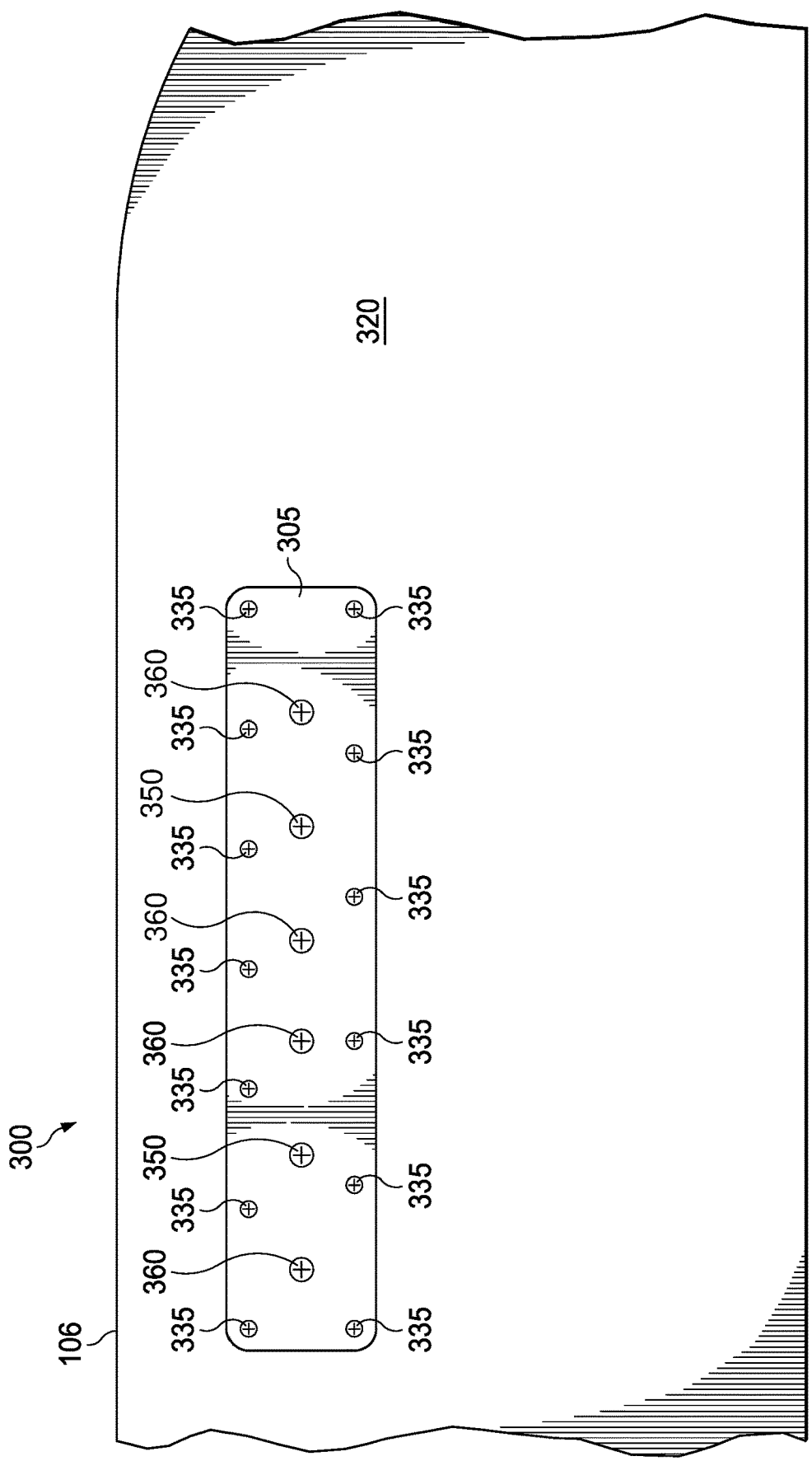
FIG. 4 shows a top view of an embodiment of the present invention.

FIG. 4 shows a top view a rotor blade 106, which includes a rotor-blade span-balancing system 300 of an embodiment of the present invention. As shown, cover 305 is installed substantially flush with rotor-blade surface 320 on the upper side of rotor blade 106, but cover 305 may also be located on the lower surface of a rotor blade 106. Cover fasteners 335 hold cover 305 to the rotor-blade surface 320. First weight-boss fasteners 350 and first weight fasteners 360 are shown.

FIG. 5 shows a cross-section of the rotor-blade span-balancing system 300 in rotor blade 106. Some components are omitted for clarity. A spanwise cross-section of a portion of the rotor-blade surface 320 and the cover 305 is shown. In this view, span-balance pocket 315 is depicted as a cavity, but span-balance pocket 315 may take other forms, such as an open space as discussed in the description of FIG. 3. Cover 305 is installed substantially flush with the rotor-blade surface 320, over span-balance pocket 315, with cover boss 330 in contact with the outboard edge 370 of span-balancing pocket 315. FIG. 5 also shows span-balance weight holes 375, through which first weight fasteners 360 are inserted, and weight boss holes 380, through which first weight-boss fasteners 350 are inserted.

FIG. 6 shows a cross-section of the rotor-blade span-balancing system 300 in rotor blade 106. Some components are omitted for clarity. Shown is a spanwise cross-section of a portion of rotor-blade surface 320 of the cover 305, with cover boss 330 in physical contact with outboard edge 370. When span-balance weights 310 are attached to cover 305, span-balance weights 310 are in physical contact with a weight boss 385, and the weight boss 385 reacts the centrifugal force of the span-balance weight to cover 305. Since the centrifugal force of cover 305 is reacted to rotor-blade surface 320 through cover boss 330, the centrifugal force of the span-balance weights 310 is ultimately reacted through outboard edge 370 to rotor blade 106. Weight bosses 385 are shown here as fastened to cover 305 with first weight-boss fasteners 350 and second weight-boss fasteners 355, weight bosses 385 may be integral with cover 305 (e.g., by being an integral machined portion of cover 305), bonded to cover 305, welded to cover 305, fastened to cover 305, attached to cover 305 by some other method, or some combination thereof. Span-balance weights 310, attached to cover 305 with first weight fasteners 360 inserted through span-balance weight holes 375 and second weight fasteners 365, are shown. Centrifugal force of span-balance weights 310 is reacted through weight bosses 385 to cover 305 and ultimately to rotor blade 106. None of the first weight fasteners 360 react centrifugal force of span-balance weights 310 to cover 305. First weight-boss fasteners 350, second weight-boss fasteners 355, first weight fasteners 360, and second weight fasteners 365 are shown in full, not in cross-section, for clarity. Non-limiting examples of second weight-boss fasteners 355 and second weight fasteners 365 include various types of nuts and washers as called for in particular applications.

In embodiments of the present invention, the loads of span-balance weights 310 are transferred to one or more weight bosses 385. Using weight bosses 385 to bear those loads is advantageous because otherwise, such loads would have to be carried evenly through fasteners with extremely small tolerances. For instance, matching two-hole patterns on two separate parts generally requires either match drilling or match—with/coordinated tooling. This problem could be avoided by sizing each bolt used to attach weights to a cover to carry the weight load by itself so that load-sharing is not as critical as it would be otherwise, but such bolts would disadvantageously weigh more and occupy space that could be put to other purposes. Embodiments of the present invention using weight bosses address these disadvantages, requiring less exacting manufacturing tolerances, making better use of the available space, allowing placement of the span-balancing weights close to the pith-change axis of a rotor blade, and eliminating load-bearing on the threaded portions of fasteners.

Figure 7:
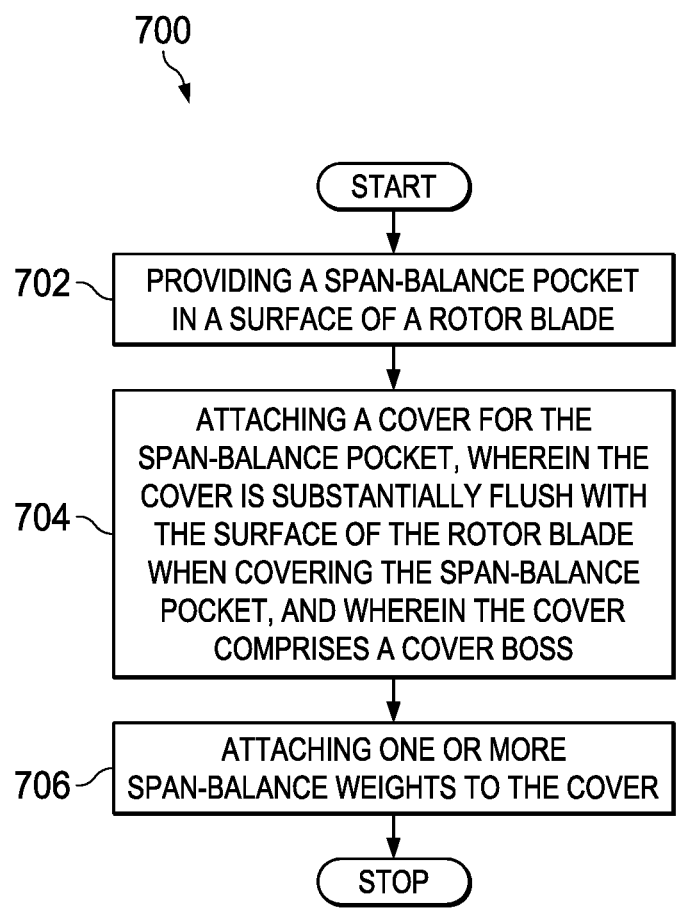
FIG. 7 shows a flowchart of a method embodiment of the present invention.

FIG. 7 shows a method embodiment of the present invention. Method of rotor-blade span balancing 700 begins with step 702, providing a span-balance pocket in a surface of a rotor blade. Method 700 continues with step 704, attaching a cover for the span-balance pocket, wherein the cover is substantially flush with the surface of the rotor blade when covering the span-balance pocket, and wherein the cover includes a cover boss. Method 700 continues with step 706, attaching one or more span-balance weights to the cover.

Rotor-blade span-balancing system 300 is shown in conjunction with rotor blade 106 of rotor system 104, a main rotor, but it may also be used in conjunction with rotor blades of tail rotors, proprotors, and wind-turbine rotors, and with propeller blades of propeller systems.

The skilled artisan will recognize that the novel rotor-blade span balancing system 300 and method 700 of the present invention provide for reaction of centrifugal forces of span-balance weights 310 through machined components a cover boss 330, reducing fatigue and degradation or materials and components, lowering operation and maintenance costs and increasing aircraft safety.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of." As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step, or a limitation) or group of integers (e.g., feature(s), element(s), characteristic(s), property(ies), method/process(s) steps, or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about," "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skill in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

All of the devices and/or methods disclosed and claimed herein can be made and executed without undue experimentation in light of the present disclosure. While the devices and/or methods of this invention have been described in terms of particular embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope, and concept of the invention as defined by the appended claims.

Furthermore, no limitations are intended to the details of construction or design herein shown, other than as described in the claims below. It is therefore evident that the particular embodiments disclosed above may be altered or modified and all such variations are considered within the scope and spirit of the disclosure. Accordingly, the protection sought herein is as set forth in the claims below.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order.

To aid the Patent Office, and any readers of any patent issued on this application in interpreting the claims appended hereto, applicants wish to note that they do not intend any of the appended claims to invoke paragraph 6 of 35 U.S.C. § 112 as it exists on the date of filing hereof unless the words "means for" or "step for" are explicitly used in the particular claim.

What is claimed is:

1. A rotor-blade span-balancing system, comprising:
   a span-balance pocket in a surface of a rotor blade;
   a cover operably configured to cover the span-balance pocket, wherein the cover is operably configured to be substantially flush with the surface of the rotor blade surface when covering the span-balance pocket, and wherein the cover comprises a cover boss that is integral with the cover and in physical contact with an outboard edge of the span-balance pocket for reacting centrifugal force of the cover into the rotor blade;
   one or more span-balance weights attached to the cover to span-balance the rotor blade with one or more weight fasteners; and
   one or more weight bosses attached to the cover and extending through the one or more span-balance weights, wherein each of the one or more span-balance weights are in physical contact with one of the one or more weight bosses.

2. The system of claim 1, wherein the rotor blade is a main rotor blade, a tail rotor blade, a proprotor blade, a propeller blade, or a wind-turbine blade.

3. The system of claim 1, wherein the cover is attached to the rotor blade with one or more cover fasteners.

4. The system of claim 3, wherein the one or more cover fasteners comprise one or more screws.

5. The system of claim 1, wherein the cover boss is a machined integral portion of the cover.

6. The system of claim 1, wherein the one or more weight fasteners comprise one or more bolts or one or more nuts.

7. The system of claim 1, wherein the one or more weight bosses are integral with the cover, bonded to the cover, welded to the cover, fastened to the cover, or some combination thereof.

8. A method of rotor-blade span balancing, comprising:
   providing a span-balance pocket in a surface of a rotor blade;
   attaching a cover for the span-balance pocket to the surface of the rotor blade, wherein the cover is substantially flush with the surface of the rotor blade when covering the span-balance pocket, and wherein the cover comprises a cover boss that is integral with the cover and in physical contact with an outboard edge of the span-balance pocket for reacting centrifugal force of the cover into the rotor blade;
   attaching one or more weight bosses to the cover; and
   attaching one or more span-balance weights to the cover with one or more weight fasteners to span-balance the rotor blade, wherein the one or more weight bosses extend through the one or more span-balance weights and each of the one or more span-balance weights are in physical contact with one of the one or more weight bosses.

9. The method of claim 8, wherein the rotor blade is a main rotor blade, a tail rotor blade, a proprotor blade, a propeller blade, or a wind-turbine blade.

10. The method of claim 8, further comprising attaching the cover to the rotor blade with one or more cover fasteners.

11. The method of claim 10, wherein the one or more cover fasteners comprise screws.

12. The method of claim 8, wherein the integral cover boss is a machined integral portion of the cover.

13. The method of claim 8, wherein the one or more weight fasteners comprise one or more bolts or one or more nuts.

14. The method of claim 1, wherein the attaching one or more weight bosses to the cover comprises machining the cover to form the one or more weight bosses to be integral with the cover, bonding the one or more weight bosses to the cover, welding the one or more weight bosses to the cover, or fastening the one or more weight bosses to the cover.

15. A rotorcraft, comprising:
a fuselage;
one or more engines coupled to the fuselage; and
one or more rotor systems coupled to the one or more engines, each rotor system comprising rotor blades, at least one rotor blade comprising:
a span-balance pocket in a surface of a rotor blade;
a cover operably configured to cover the span-balance pocket, wherein the cover is operably configured to be substantially flush with the surface of the rotor blade when covering the span-balance pocket, and wherein the cover comprises a cover boss that is integral with the cover and in physical contact with an outboard edge of the span-balance pocket for reacting centrifugal force of the cover into the rotor blade;
one or more span-balance weights attached to the cover with one or more weight fasteners to span-balance the rotor blade; and
one or more weight bosses attached to the cover and extending through the one or more span-balance weights, wherein each of the one or more span-balance weights are in physical contact with one of the one or more weight bosses.

16. The rotorcraft of claim 15, wherein the rotor blade is a main rotor blade, a tail rotor blade, a proprotor blade, a propeller blade, or a wind-turbine blade.

17. The rotorcraft of claim 15, wherein the cover is attached to the rotor blade with one or more cover fasteners.

18. The rotorcraft of claim 15, wherein the one or more cover fasteners comprise one or more screws.

19. The rotorcraft of claim 15, wherein the cover boss is a machined integral portion of the cover.

20. The rotorcraft of claim 15, wherein the one or more weight fasteners comprise one or more bolts or one or more nuts.

21. The rotorcraft of claim 15, wherein the one or more weight bosses are integral with the cover, bonded to the cover, welded to the cover, fastened to the cover, or some combination thereof.

* * * * *